United States Patent Office 3,335,112
Patented Aug. 8, 1967

3,335,112
EPOXY RESIN SYSTEMS AND LATENT
CATALYSTS THEREFOR
Henry C. Marks, Glen Ridge, N.J., assignor to Wallace & Tiernan Inc., Belleville, N.J., a corporation of Delaware
No Drawing. Filed July 3, 1963, Ser. No. 292,761
10 Claims. (Cl. 260—47)

This invention relates to epoxy resins. More particularly, this invention relates to epoxy resin systems containing a latent catalyst. In accordance with one embodiment, this invention is directed to special compositions useful as latent catalysts in epoxy resin systems and to their method of preparation. In accordance with another embodiment, this invention is directed to epoxy resin systems containing therein a latent catalyst for effecting the curing of the epoxy resin. In accordance with yet another embodiment, this invention is directed to cured or hardened epoxy resins wherein the curing of the epoxy resin is effected by heating the epoxy resin in the presence of a latent catalyst.

A useful and desirable development in the epoxy resin field would be the development of an epoxy resin system which would remain inactive at room temperature and under normal storage conditions and which could be completely cured or hardened at some convenient elevated temperature without the addition of another component thereto.

Single or one-part epoxy resin systems containing a latent catalyst effective upon the application of heat to cure the epoxy resin in such systems without the addition of an extraneous added component have been proposed. For example, dicyandiamide and boron trifluoride complexes have been proposed as latent catalysts in epoxy resin systems. These materials, however, have not been completely satisfactory as latent catalysts since boron trifluoride complexes are corrosive and difficult to handle and store and epoxy resins cured by means of boron trifluoride complexes as latent catalysts have exhibited some unsatisfactory properties. Dicyandiamide as a latent catalyst in epoxy resin systems has an activation temperature which is too high for general use. Amine salts of weak acids have also been proposed as latent catalysts in single or one-part epoxy resin systems but these materials are not stable enough to avoid a slow gradual cure of the epoxy resin system during shelf storage.

Conventional epoxy resins are prepared by reacting bis-(4-hydroxyphenyl)-2,2-propane or bisphenol A with epichlorohydrin in an alkaline system and have the general formula:

particularly useful as catalysts in this method of effecting curing or hardening of epoxy resins.

Accordingly, it is an object of this invention to provide an improved latent catalyst suitable for effecting curing or hardening of epoxy resins.

Another object of this invention is to provide an improved, curable one-part or single epoxy resin system.

Yet another object of this invention is to provide a one-part or single epoxy resin system having a latent catalyst therein, the epoxy resin system being capable of long storage or shelf-life and capable of being cured or hardened at a convenient elevated temperature.

Still another object of this invention is to provide an improved cured or hardened epoxy resin system.

How these and other objects of this invention are achieved will become apparent in the light of the accompanying disclosure.

It has now been discovered that tertiary amines adsorbed on an adsorbent are effective as latent catalysts for epoxy resins for the preparation of one-part or single epoxy resin systems. The carrier or adsorbent employed in the preparation of latent catalysts are those adsorbents which bind the tertiary amine so that the resulting composition, tertiary amine adsorbed on or bound to the adsorbent or carrier, is stable at room temperature and the tertiary amine is bound thereon at room temperature but is released in the presence of the epoxy resin which reacts therewith at a convenient elevated temperature, such as a temperature of about 125° C. Accordingly, a single or one-part epoxy resin system containing a tertiary amine latent catalyst of the type described herein would exhibit a relatively long shelf or pot life but would become cured or hardened when the epoxy resin system is heated to a conveniently elevated temperature, about 125° C.

Various carriers or adsorbents are useful in the practice of this invention. Suitable adsorbents for effecting the adsorption and binding of tertiary amines at about room temperature and for the release of the adsorbed tertiary amines in the presence of the epoxy resin at an elevated temperature, about 125° C., include the various acidic ion exchange resins. Examples of suitable adsorbents are the sulfonated polystyrene, copolymerized divinyl benzene-methacrylic acid, silicic acid (silica gel), sulfonated coal (Zeocarb) and the like.

Particularly preferred as adsorbents for the tertiary amines in the practice of this invention are the acidic ion exchange resins. When tertiary amines are adsorbed thereon, the resulting amine resinates are stable at room temperature. At an elevated temperature, however, such as a temperature of about 125° C., and in the presence of the epoxy resin the tertiary amine is released and is effective

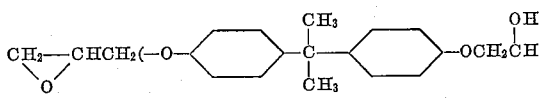 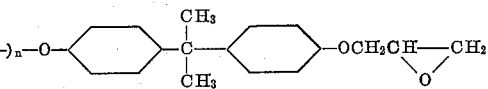

Epoxy resins are cured or hardened by the reaction of the hydroxyl group or the epoxy ring with a compound containing an active hydrogen to form a tightly knit cross-linked polymer. This curing or hardening of the epoxy resin can be brought about by two methods. In one method the cross-linking is effected by copolymerizing the epoxy resin with a curing agent in approximately stoichiometric amounts. Suitable curing agents in this method include various acid anhydrides, acids and primary and secondary amines. Curing or hardening by the other method is effected by the use of catalysts usually in amounts much less than stoichiometric. In this other method of curing the epoxy resin itself is usually the main reactant although the catalyst can also be used to cure cross-linking agents which are not reactive and which require some initiation to effect cure. Tertiary amines are to cure or harden the epoxy resin in contact therewith. The tertiary amine resinates can convenienly be used in one-part or single epoxy resin systems which could be stored at room temperature and then cured at some convenient high temperature.

In general, any tertiary amine, i.e., an organic compound having the grouping

wherein each of the three nitrogen valence bonds is attached to a carbon atom and wherein the total of the three valence bonds is attached to one or more carbon atoms, capable of being adsorbed or bonded to the adsorbent carrier and desorbed or released therefrom in the presence of epoxy resin at an elevated temperature of about 125° C. may be employed in the practice of this invention. Any tertiary amine which is capable of curing epoxy resins can be adsorbed on the adsorbents identified herein to produce the latent catalyst compositions of this invention.

Suitable such tertiary amines include the tertiary aliphatic amines, such as the various tertiary alkylamines, e.g. trimethylamine, triethylamine, tripropylamine, ethyldimethylamine and the like.

Also suitable as tertiary amines in the practice of this invention are the tertiary aromatic amines including benzoyl-N, N-dimethylamine and the dimethylaminomethyl phenols, such as O-dimethylaminomethyl phenol sold as DMP–10 by Rohm & Haas, 2,4,6-tris (dimethylaminomethyl) phenol sold as DMP–30 by Rohm & Haas, and 1,4-diazabicyclo-2.2.2-octane sold as Dabco by Matheson Chemical Co., Inc.

The latent catalyst comprising a tertiary amine, such as a tertiary alkylamine, adsorbed or bound to a suitable adsorbent, such as an acidic ion exchange resin, may be prepared in the following manner. The ion exchange resin is washed, preferably with distilled water, to remove any water-soluble contaminants therefrom. The washing operation may be carried out by mixing one volume of the ion exchange resin with two volumes of distilled water for several minutes, permitting the resin to settle and decanting the water. Desirably, the washing operation is carried out twice and after the last water washing the resin is transferred to a filter or suitable device for a final water wash and then allowed to drain.

Following the water washing operation the resulting ion exchange material, now substantially free of water-soluble material or contaminants, is treated with an excess of hydrochloric acid so as to substantially completely convert the resin to the acid or hydrogen form. This is accomplished by transferring the resin to a suitable container and adding thereto approximately two volumes of dilute aqueous hydrochloric acid per volume of ion exchange resin. The mixture is then stirred for a suitable length of time, about 30 minutes, to assure complete conversion of the ion exchange resin to the hydrogen form and the pH of the solution measured or suitably controlled to maintain the acid treated solution below 2.

The resulting converted resin is then transferred to a suitable filter and washed with water until the wash water filtrate is neutral. Following the aforesaid operations the resin is now conditioned for effecting the adsorption of the tertiary amine thereon.

In effecting the adsorption of the tertiary amine on the ion exchange resin the capacity of the resin in milliequivalents per gram is employed as the basis for determining the amount of the tertiary amine to be applied. Usually, information as to the capacity of the ion exchange resin is known or available from the manufacturer. In the instance where the capacity of the ion exchange resin is not known or is otherwise unavailable, an amount of the tertiary amine to be employed is applied to the resin well in excess of the adsorptive capacity of the resin. Usually, the tertiary amine is applied by means of an aqueous solution but, if desired, a nonaqueous solution, such as an alcoholic tertiary amine solution, may be employed. In practice, the weight of the resin multiplied by the specific capacity of the resin in milliequivalents gives the equivalents of the tertiary amine to be applied. This amount of tertiary amine is dissolved in water, preferably in an amount of water to form a 25% tertiary amine solution. This tertiary amine solution is then added with stirring to the resin and maintained in contact therewith until equilibrium is reached. Equilibrium is determined by withdrawing a sample of the solution and titrating the tertiary amine content. This testing is continued at about half hour intervals until a constant level is reached, thereby indicating the attainment of equilibrium conditions.

When equilibrium is reached the resin is filtered and washed with water until no tertiary amine is titratable in the wash water. The wash water filtrate is then titrated for tertiary amine content and from the amount of tertiary amine in the wash water filtrate and the amount of tertiary amine applied to the resin the amount of tertiary amine adsorbed is calculated. The resin, now containing tertiary amine adsorbed thereon, is then dried in an oven, suitably at a temperature of about 60° C. A nitrogen analysis on the resulting dried resin calculated to the tertiary amine on the resin checks closely with the value obtained by the above described titrations.

Various tertiary amines adsorbed on various adsorbents were tested and evaluated as latent catalysts in epoxy resin systems in accordance with this invention. In these test evaluations the epoxy resin formulation for solid systems was substantially as follows:

| | Pt. by wt. |
|---|---|
| Epoxy resin (Epon 828 manufactured by Shell Chemical company) | 100 |
| Curing agent (Harcure A, a linear polysebacic anhydride manufactured by Harchem Division of Wallace & Tiernan Inc.) | 80 |
| Filler and suspending agent (Cab-O-Sil manufactured by Cabot Corp.) | 5 |
| Ion exchange resin containing adsorbed amine | 5 |

In preparing a solid epoxy resin system for evaluation, the epoxy resin and curing agent in measured amounts were admixed and heated to a sufficiently high temperature, usually in the range 80–90° C., to melt the curing agent so as to form a homogeneous system. The resulting admixture was then cooled to about 70° C. and the filler agent and the ion exchange resin containing adsorbed tertiary amine were added and stirred thereinto. A portion of this admixture was then poured into an aluminum dish and placed in an oven at a conveniently elevated temperature, about 125° C. This material in the oven was inspected about every 15 minutes to determine the time required for the material to form a firm gel. The remaining portion of the epoxy resin system was placed in a constant temperature room, about room temperature, for storage tests and inspected about every month to determine any increase in viscosity or change in gelling time.

In the evaluation of tertiary amine resinates, as latent catalysts in liquid epoxy resin systems, methylbicyclo-[2.2.1] hept-5-ene-2,3-dicarboxylic anhydride, sold by National Analine Division of Allied Chemical Corp. as Methyl Nadic Anhydride, was substituted as the curing agent in place of Harcure A. This material is a liquid acid anhydride and the evaluation tests were carried out by stirring the epoxy resin with the curing agent at room temperature and adding the filler or suspending agent and the tertiary amine resinate. The liquid epoxy resin system had the following formulation:

| | Pt. by wt. |
|---|---|
| Epoxy resin (Epon 828) | 100 |
| Methylbicyclo-[2.2.1]hept-5-ene-2,3-dicarboxylic anhydride (Methyl Nadic Anhydride) | 85 |
| Filler agent (Cab-O-Sil) | 5 |
| Tertiary amine resinate | 5 |

A portion of the liquid epoxy resin system undergoing test was transferred to an aluminum dish and placed in an oven maintained at a temperature of about 125° C. The material in the oven was then inspected about every 15 minutes to determine the time required to form a firm gel. The remainder of the liquid epoxy resin system undergoing test was placed in a constant temperature room maintained at about room temperature where it was periodically inspected, about every week, to determine any change in viscosity or gelling time.

The test results observed in the testing of the solid epoxy resin systems are set forth in accompanying Table I and the test results observed in the testing of the liquid epoxy resin systems are set forth in accompanying Table II:

TABLE I

| Resin | Percent N on resin | Percent Trimethyl amine (TMA) on resin | Percent TMA in system | Gel time, hours |
|---|---|---|---|---|
| Sulfonated polystyrene (Amberlite 200) | 3.4 | 14.3 | 0.37 | 0.75 |
| Sulfonated polystyrene (Amberlite XE69) | 1.5 | 6.3 | 0.16 | 1.75 |
| Divinyl benzenemethacrylic acid copolymer (Amberlite XE64) | 9.0 | 37.9 | 0.99 | 2.50 |
| Phosphonic acid groups on polymer backbone (Duolite ES-63) | 3.9 | 16.4 | 0.43 | 0.50 |
| Silicic acid | 1.3 | 5.4 | 0.14 | 1.25 |

All of the above resins were saturated with trimethyl amine. All resins were evaluated in the formula containing Harcure A as previously described. All one-component systems from this formula were tested for gel time by the procedure described. A portion of every preparation was placed in a constant temperature room and examined periodically. All of the above solid systems were found to be stable with no appreciable change in gel time after from three to six months storage.

TABLE II

| Resin | Percent N on resin | Percent Trimethyl- amine (TMA) on resin | Percent TMA in system | Gel time, hours | Gel time in hours after storage— | |
|---|---|---|---|---|---|---|
| | | | | | 4 Wks. | 8 Wks. |
| Sulfonated polystyrene (Amberlite 200) | 3.4 | 14.3 | 0.36 | 1.0 | | 0.75 |
| Sulfonated polystyrene (Amberlite XE-69) | 1.5 | 6.3 | 0.16 | 1.75 | | 1.75 |
| Divinyl benzene-methacrylic acid copolymer (Amberlite XE-112) | | | | 1.0 | | |
| Phosphonic acid groups on polymer backbone (Duolite ES-63) | 3.9 | 16.3 | 0.42 | 0.75 | | |
| Methylene sulfonic (Duolite C-10) | 2.0 | 8.5 | 0.22 | 8+ | 0.5 | |
| Macroreticular sulfonated polystyrene (Amberlite 15) | 4.8 | 20.3 | 0.52 | 0.9 | | |
| Sulfonated Coal (Zeocarb) | 3.5 | 14.7 | 0.38 | 8.5 | | |
| Silicic acid | 1.3 | 5.4 | 0.14 | 1.0 | | |

Additionally, various tertiary amines adsorbed on ion exchange resins were tested as latent catalysts for both liquid epoxy resin systems and solid epoxy resin systems. The test results observed are reported in accompanying Table III for the solid epoxy resin systems and in accompanying Table IV for the liquid epoxy resin systems.

TABLE III

| Amine | Resin | Percent Amine on resin | Percent amine in system | Gel time, hours |
|---|---|---|---|---|
| Trimethylamine | Amberlite 200 | 14.0 | 0.37 | 0.75 |
| Do | Amberlite XE-64 | 35.9 | 0.94 | 2.55 |
| DMP-10 | do | 32.4 | 0.85 | 1.70 |
| DMP-30 | do | 21.8 | 0.58 | 2.25 |
| Pyridine | Amberlite 200 | 11.6 | 0.31 | 0.50 |

The gel times were determined as described and the systems when stored for observation were stable with no change in gel time observed after three to six months. When pyridine was used as the amine, the cured resin became very dark.

TABLE IV

| Amine | Resin | Percent Amine on resin | Percent amine in system | Gel time, hours |
|---|---|---|---|---|
| Trimethylamine | Amberlite 200 | 14 | 0.36 | 1.00 |
| DMP-10 | do | 32.4 | 0.83 | 1.75 |
| DMP-30 | do | 21.8 | 0.56 | 2.00 |
| Pyridine | do | 11.6 | 0.30 | 1.00 |
| Dabco | do | | | 2.75 |

When these systems were allowed to stand in a constant temperature room at 25° C., they all gradually became more viscous. The DMP-10 system showed a moderate increase in viscosity after four weeks. Some of these systems tend to solidify upon long-continued storage at room temperature but in most cases the solid materials still can be melted readily to provide a liquid having substantially the same curing characteristics. The pyridine system changed to a brittle solid in five weeks with a decrease in gel time from the original one hour to a half hour.

In the examples reported in connection with Tables III and IV utilizing trimethylamine, other tertiary alkyl amines such as triethylamine, tripropylamine, dimethylethylamine and the like may be substituted in whole or in part for the trimethylamine with equivalent or substantially the same results, these other tertiary amines being adsorbed on the resin in substantially the same molar proportions as the trimethylamine.

Various tests were carried out in order to determine the effect of the amount of tertiary amine in the epoxy resin system undergoing test. In one test method a decreasing amount of tertiary amine saturated ion exchange resin was added to the epoxy resin system and in another test method a partially tertiary amine saturated ion exchange resin, to only one-half of capacity with a tertiary amine, was added to the epoxy resin system undergoing test. The effect of varying amounts of tertiary amines in solid epoxy resin systems are set forth in accompanying Table V and the effect of varying amounts of tertiary amines in liquid epoxy resin systems are set forth in accompanying Table VI.

TABLE V

| Amine resinate | Percent saturated | Percent amine on resin | phr Resinate in system | Percent amine in system | Gel time, hours |
|---|---|---|---|---|---|
| TMA-Amberlite 200 | 100 | 13 | 5 | 0.341 | 0.75 |
| Do | 100 | 13 | 2.5 | 0.173 | 0.84 |
| Do | 100 | 13 | 1.25 | 0.087 | 1.25 |
| Do | 50 | 7.1 | 5 | 0.187 | 3.50 |

TABLE VI

| Amine resinate | Percent saturated | Percent amine on resin | phr Resinate in system | Percent amine in system | Gel time, hours |
|---|---|---|---|---|---|
| TMA-Amberlite 200 | 100 | 13.0 | 5 | 0.333 | 1.00 |
| Do | 100 | 13.0 | 2.5 | 0.168 | 1.25 |
| Do | 100 | 13.0 | 1.25 | 0.085 | 2.25 |
| Do | 75 | 9.8 | 5 | 0.25 | 2.75 |
| Do | 50 | 8.65 | 5 | 0.221 | 6.00 |
| Do | [1] 100 | 13.0 | [1] 2.5-2.5 | 0.167 | 10.00 |
| TMA-Duolite ES-63 | 100 | 16.3 | 5 | 0.418 | 0.75 |
| Do | 75 | (12.3) | 5 | (0.314) | 0.84 |

[1] In this test 2.5 phr of the fully saturated resinate and 2.5 phr of washed and dried Amberlite 200 containing no amine were used in the system.

The above test systems became viscous on standing. The fully saturated TMA-Amberlite 200 system at 5 phr became very viscous in three weeks, at 2.5 phr it became very viscous in four weeks and at 1.25 phr there was only slight viscosity increase after two weeks. The system with the longest gel time, containing 2.5 phr of the fully saturated resin and 2.5 phr of the untreated resin, showed little change in viscosity after two weeks. Although there was an increase in viscosity on standing, there was no change in gel time when the mixtures were cured after standing from two to four weeks.

The effect of the particle size of the adsorbent, such as the ion exchange resin, employed as the latent catalyst in the epoxy resin systems was also tested. It was noted that adsorbents, such as ion exchange resins, in coarse, granular form, as received, were not completely satisfactory in that these materials containing adsorbed tertiary amines settled to the bottom of the epoxy resin system when liquefied and caused localized curing and bubbles in the cured epoxy resins.

The adsorbent material containing adsorbed tertiary amines, i.e., the tertiary amine-ion exchange resinates, were micropulverized and screened and it was found that tertiary amine adsorbent material, such as tertiary amine-ion exchange resinate materials, having a particle size below 200 mesh not only reduced bubbling during the curing operation but also produced a better appearing and more evenly cured epoxy resin. Also, these materials exhibited an increased curing activity as indicated by decreased gel time. The test results are set forth in accompanying Table VII:

TABLE VII
[Effect of particle size]

| Amine Resinate | Gel time, hours | |
|---|---|---|
| | Coarse resinate | Micropulverized resinate |
| TMA-Amberlite 200 | 2 | 0.5 |
| TMA-Dowex 50wx8 | 4 | 2.5 |

In general, tertiary amine-adsorbents, such as tertiary amine-ion exchange resinates, showed improved performance as latent catalysts in epoxy resin systems when the particle size of these materials was in the range 100–400 mesh, preferably in the range 200–325 mesh.

The effect of cross-linking of the adsorbent material, such as the ion exchange resin, with the epoxy resin in solid epoxy resin systems was tested. The ion exchange resins employed in these tests were sulfonated polystyrene type having up to 25%, such as 1–10%, by weight divinylbenzene added for increased cross-linking effect. Such resins are manufactured and sold by the Dow Chemical Company under the trademarks Dowex 50wx2 and 50wx8, respectively. The test results concerning cross-linking of the ion exchange resin with the epoxy resin are set forth in accompanying Table VIII:

TABLE VIII
[Effect of cross-linking]

| Amine Resinate | Percent N on resin | Percent amine on resin | Percent amine in system | Gel time, hours |
|---|---|---|---|---|
| TMA-Dowex 50wx2 | 4.9 | 20.6 | 0.54 | 4.0 |
| TMA-Dowex 50wx8 | 4.9 | 20.5 | 0.54 | 9.0 |

The tested solid epoxy resin systems were observed to be stable for at least 2½ months with no change in gel time even after this storage period.

The influence of moisture level in the tertiary amine ion exchange resin was also tested since some differences had been observed in comparing resinates which had been dried differently. Usually the tertiary amine-ion exchange resinates after preparation are dried overnight at about 50° C. prior to testing. Two tertiary amine-ion exchange resinates were prepared and after drying at 95° C. to a constant weight were evaluated with similar tertiary amine-ion exchange resins dried in the usual manner. The test results observed are set forth in accompanying Table IX.

TABLE IX

| Amine Resinate | Drying Procedure | Gel time, hours |
|---|---|---|
| TMA-Amberlite 200 | Overnight at 50° C | 1 |
| | Constant weight at 95° C | 1 |
| 75% TMA-Amberlite 200 | Overnight at 50° C | 2.77 |
| | Constant weight at 95° C | 3.15 |

Tests for permanence were also carried out. In these tests two liquid epoxy resin systems employing tertiary methylamine-sulfonated polystyrene ion exchange resin (TMA- Amberlite 200) and 2,4,6-tri(dimethylaminomethyl) phenol sulfonated polystyrene exchange resin (DMP-30-Amberlite 200) as latent catalysts were cured and cut into two 2" diameter pieces for tests with respect to water absorption and loss in weight upon exposure to air. The results of these tests are set forth in accompanying Table X:

TABLE X

[Permanence of amine resinate cured epoxies]

| | TMA-Amberlite 200, Percent | DMP-30 Amberlite 200, Percent |
|---|---|---|
| Air Loss (165 hrs. at 180° C.) | 0.1 | 2.3 |
| Water Absorption (2 hour water boil) | +0.38 | +1.09 |

The effect of the adsorbent material, particularly the ion exchange resin, per se, on the epoxy resin system, employing liquid epoxy resin systems as test systems, was also tested. The results of these tests are set forth in accompanying Table XI:

TABLE XI

| Ion Exchange Resin | Form | Gel time, hours |
|---|---|---|
| Amberlite 200 | H+, moderately dried | 15+, no gel. |
| Do | H+, oven dried | Do. |
| Do | Sodium form | Do. |

The hydrogen form resins caused a bad odor during cure, but the liquid systems containing these untreated ion exchange resins did not change viscosity after two weeks' storage. The sodium form of the resin caused no odor during cure and remained unchanged in viscosity for four days.

The foregoing tests indicated that the ion exchange resins showing specially satisfactory usefulness are the macroreticular sulfonated polystyrene ion exchange resins (such as Amberlite 200) and the copolymerized divinylbenzenemethacrylic acid ion exchange resin (such as Amberlite XE–112). The foregoing tests also indicated that the sulfonated polystyrene ion exchange resins, such as Amberlite XE–69, Amberlite IR–120 and Dowex 50 x 8, are generally satisfactory as well as the copolymerized divinyl-benzenemethacrylic ion exchange resins, such as Amberlite XE–64. The test results indicate that both the strong acid type of sulfonated polystyrene ion exchange resins and the weak acid type divinylbenzene-methacrylic acid copolymer ion exchange resins are also useful.

Of the tertiary amines, trimethylamine, although showing satisfactory activity in the curing of epoxy resins is too volatile for general use. Dimethylamino-methylphenol (DMP–10) and 2,4,6-tri(dimethylaminomethyl) phenol (DMP–30) are particularly useful. When employed in the form of amine-ion exchange resinates the activity of these tertiary amines, however, appears to have been lowered. It is speculated that because of the size and form of the trimethylamine molecules and that of the other amines there may be some steric effect hindering the effectiveness of the large, more branched tertiary amines as latent catalysts in epoxy resin systems prepared and tested herein showed good storage capacity, in some instances over six months, and no difference in gel time or curing rate was observed. In the liquid epoxy resin systems tested, a gradual increase in viscosity, indicating slow reactivity in the system, was observed in all cases. This reactivity was found to be related with the gel time of the resinate. Those systems showing a fast gel time became more viscous more quickly than those showing a slow gel time.

It was observed, as indicated by the foregoing tests, that the amount of tertiary amine employed, such as adsorbed on the adsorbent carrier or bound to the ion exchange resin carrier, has an effect on the curing of the epoxy resin. Generally, an epoxy resin system containing a smaller amount of tertiary amine took a longer time to gel. For example, it was observed in liquid epoxy resin systems that one such system containing 5 phr. of a completely saturated tertiary amine-ion exchange resinate gelled in one hour whereas a mixture containing 2.5 phr. of this same resinate gelled in 1.25 hours. The unconverted or unsaturated acid groups of the ion exchange resin tended to slow gelling. This was evidenced in the liquid epoxy resin systems when the 5 phr. resinate used was composed of 2.5 phr. of the saturated resin and 2.5 phr. of the untreated resin to give a gel time of 10 hours. In another test employing the same system using 5 phr. of a resinate only 50% saturated with a tertiary amine the gelling time was 6 hours. Accordingly, with approximately the same amine content in the liquid epoxy resin system the gel times of 1.25, 6 and 10 hours were observed. It would appear, therefore, that unreacted acid groups inhibit curing by retarding release of the tertiary amine.

As will be apparent to those skilled in the art in the light of the foregoing disclosure, many modifications, alterations and substitutions are possible in the practice of this invention without departing from the spirit or scope thereof.

I claim:

1. A composition comprising a curable epoxy resin and as a catalytic curing agent for said epoxy resin a minor amount of a tertiary amine adsorbed on an acidic synthetic organic ion exchange resin, said composition being capable of being cured when heated to a temperature of about 125° C. and said curable epoxy resin being a polyepoxy polyether derived from a difunctional phenolic compound and epichlorohydrin.

2. A composition in accordance with claim 1 wherein said ion exchange resin is a sulfonated polystyrene ion exchange resin.

3. A composition in accordance with claim 1 wherein said ion exchange resin is a copolymer of divinyl benzene and methacrylic acid.

4. A composition in accordance with claim 1 wherein said ion exchange resin is a sulfonated copolymer of styrene and divinyl benzene containing up to about 25% by weight equivalent divinyl benzene.

5. A composition in accordance with claim 1 wherein said ion exchange resin is a sulfonated copolymer of styrene and divinyl benzene containing in the range 1–10% by weight equivalent divinyl benzene.

6. A composition in accordance with claim 1 wherein said acidic synthetic organic ion exchange resin is an acidic sulfonated synthetic organic ion exchange resin.

7. A composition in accordance with claim 1 wherein said curable epoxy resin is derived by reacting bisphenol A with epichlorohydrin.

8. The method which comprises admixing with a curable epoxy resin a minor amount of a tertiary amine adsorbed on an acidic synthetic organic ion exchange resin and heating the resulting admixture to an elevated temperature of about 125° C. to cure said epoxy resin, said curable epoxy resin being a polyepoxy polyether derived from a difunctional phenolic compound and epichlorohydrin.

9. The method of claim 8 wherein said acidic synthetic organic ion exchange resin is a sulfonated synthetic organic ion exchange resin.

10. The method in accordance with claim 8 wherein said curable epoxy resin is derived by reacting bisphenol A with epichlorohydrin.

References Cited

UNITED STATES PATENTS

| | | | |
|---|---|---|---|
| 2,882,244 | 4/1959 | Milton | 260 |
| 2,990,332 | 6/1961 | Keating | 260—2.2 |
| 3,018,264 | 1/1962 | Colclough | 260 |

OTHER REFERENCES

Kunin, Ion Exchange Resins, pages 44–45, 82–87, 248–249, and 252–253, John Wiley and Sons, New York 1958.

WILLIAM H. SHORT, *Primary Examiner.*

J. C. MARTIN, M. GOLDSTEIN,
*Assistant Examiners.*

UNITED STATES PATENT OFFICE
CERTIFICATE OF CORRECTION

Patent No. 3,335,112                                          August 8, 1967

Henry C. Marks

It is hereby certified that error appears in the above numbered patent requiring correction and that the said Letters Patent should read as corrected below.

Column 5, TABLE III, last column, line 2 thereof, for "2.55" read -- 2.50 --; same TABLE III, same column, line 3 thereof, for "1.70" read -- 1.75 --; column 8, TABLE IX, last column, line 3 thereof, for "2.77" read -- 2.75 --; same TABLE IX, same column, line 4 thereof, for "3.15" read -- 3.17 --; column 9, line 71, for "systems" read --
        systems.
          All the solid epoxy resin
        systems --.

Signed and sealed this 24th day of September 1968.

(SEAL)
Attest:

EDWARD M. FLETCHER, JR.                        EDWARD J. BRENNER
Attesting Officer                                 Commissioner of Patents